United States Patent [19]
Sano et al.

[11] Patent Number: 5,694,188
[45] Date of Patent: Dec. 2, 1997

[54] REFLECTION TYPE LIQUID CRYSTAL DISPLAY DEVICE HAVING COMB-SHAPED WALL ELECTRODE

[75] Inventors: Kenji Sano, Tokyo; Kenji Todori; Yutaka Majima, both of Yokohama; Masayuki Sekimura; Akinori Hongu, both of Tokyo; Taeko I. Urano, Kawasaki; Shigeru Machida, Tokyo; Koji Asakawa, Kawasaki, all of Japan

[73] Assignee: Kabushiki Kaisha Toshiba, Kawasaki, Japan

[21] Appl. No.: 528,264

[22] Filed: Sep. 14, 1995

[30] Foreign Application Priority Data

Sep. 17, 1994 [JP] Japan ........................ 6-248462
Mar. 16, 1995 [JP] Japan ........................ 7-057772

[51] Int. Cl.$^6$ ........................................... G02F 1/1343
[52] U.S. Cl. ........................................... 349/139
[58] Field of Search ........................ 359/87, 59, 91; 349/139, 143, 41, 42

[56] References Cited

U.S. PATENT DOCUMENTS

| | | | |
|---|---|---|---|
| 3,772,874 | 11/1973 | Lefkowitz | 359/87 |
| 5,517,343 | 5/1996 | Yamahara et al. | 359/87 |

FOREIGN PATENT DOCUMENTS

| | | | |
|---|---|---|---|
| 48-6690 | 1/1973 | Japan . | |
| 61-37637 | 8/1986 | Japan . | |
| 62-8127 | 1/1987 | Japan | 359/87 |
| 62-121424 | 6/1987 | Japan | 359/87 |
| 2-124536 | 5/1990 | Japan | 359/54 |
| 3-174514 | 7/1991 | Japan | 359/87 |
| 6-95158 | 4/1994 | Japan | 359/87 |
| 6-250159 | 9/1994 | Japan . | |

*Primary Examiner*—William L. Sikes
*Assistant Examiner*—James A. Dudek
*Attorney, Agent, or Firm*—Oblon, Spivak, McClelland, Maier & Neustadt, P.C.

[57] ABSTRACT

A liquid crystal display device comprises two substrates opposed to each other, a comb-shaped wall electrode formed to correspond to each pixel of an array defined by vertical and horizontal wires formed on the substrate, the comb-shaped wall electrode having a plurality of elemental electrodes, major surfaces of each of the elemental electrodes being substantially perpendicular to the surfaces of the two substrates, and the major surfaces of adjacent ones of the elemental electrodes constituting counter electrodes to each other, and a liquid crystal filled in a gap of the comb-shaped wall electrode provided between the two substrates.

19 Claims, 9 Drawing Sheets

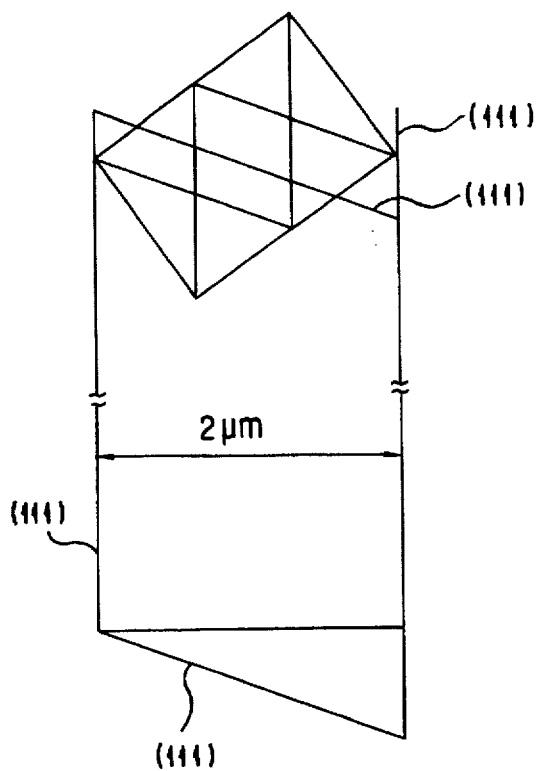
F I G. 3
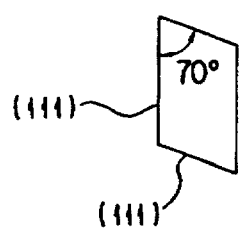
F I G. 4A
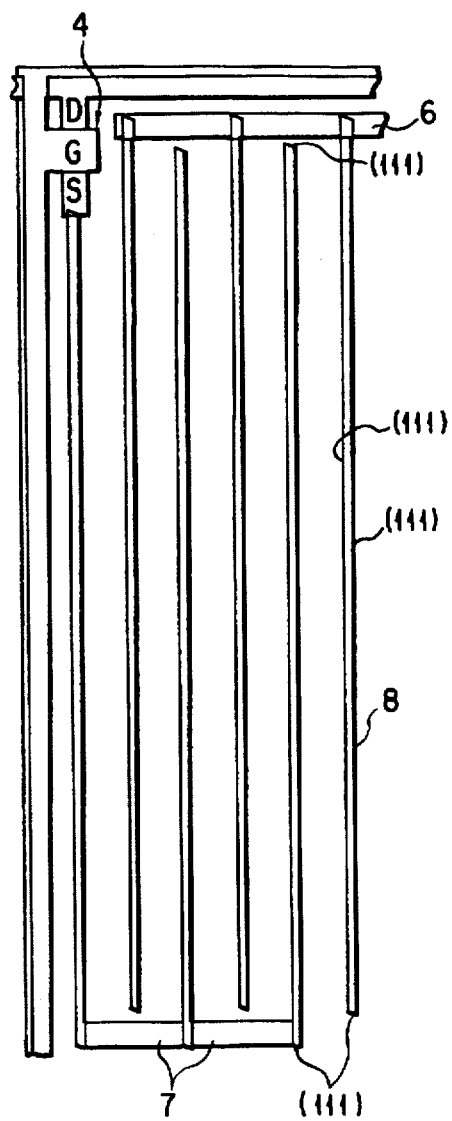
F I G. 4B

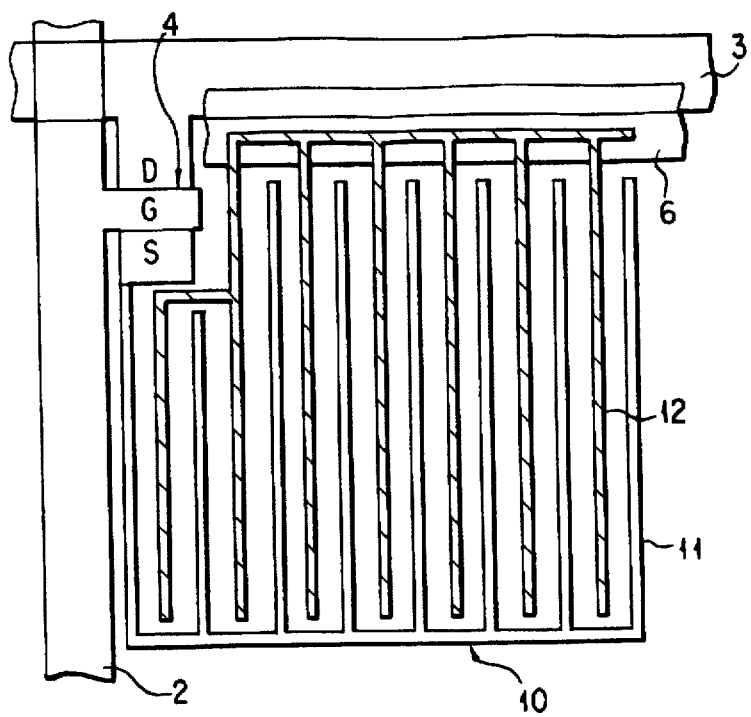
F I G. 9
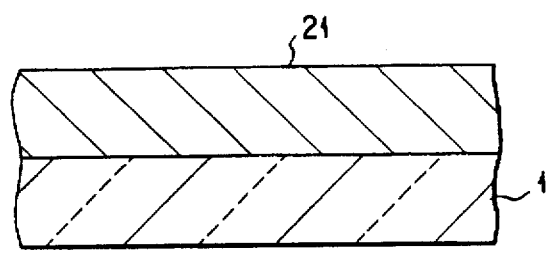
F I G. 11A
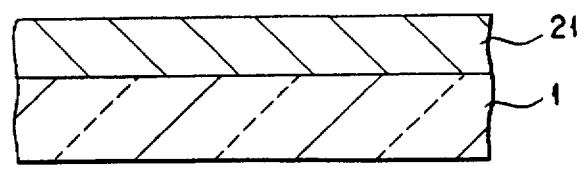
F I G. 11B
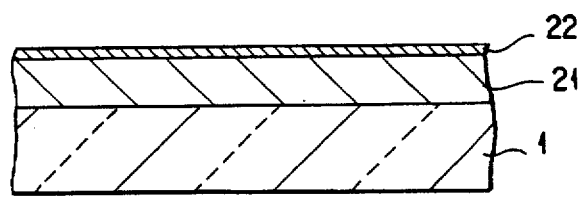
F I G. 11C
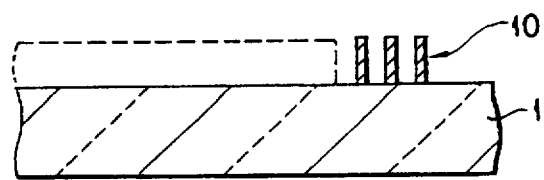
F I G. 11D

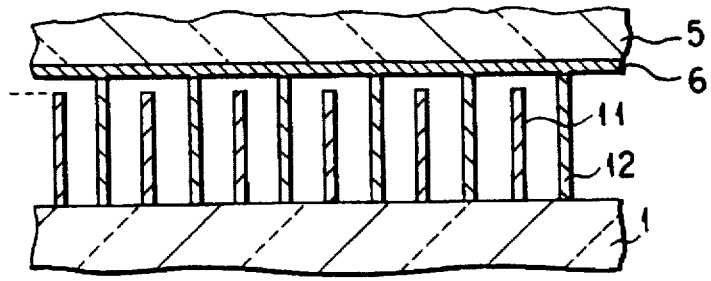
F I G. 12
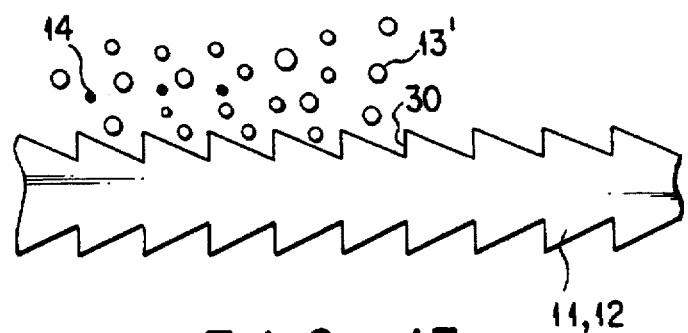
F I G. 13
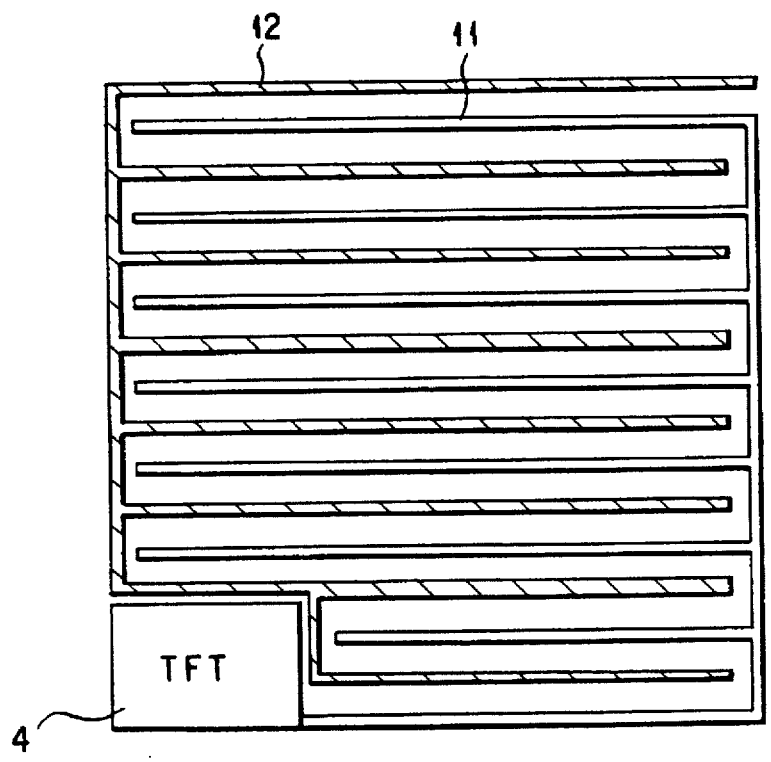
F I G. 14

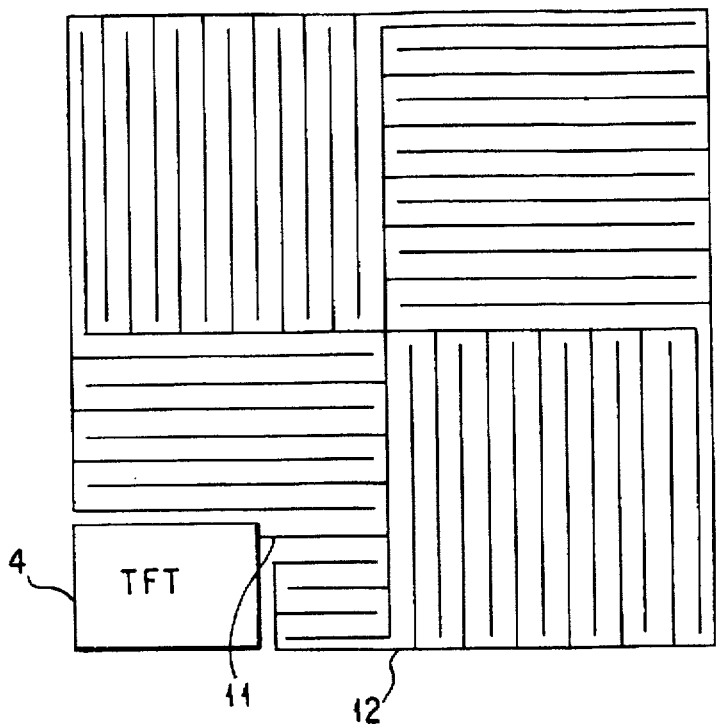
F I G. 15
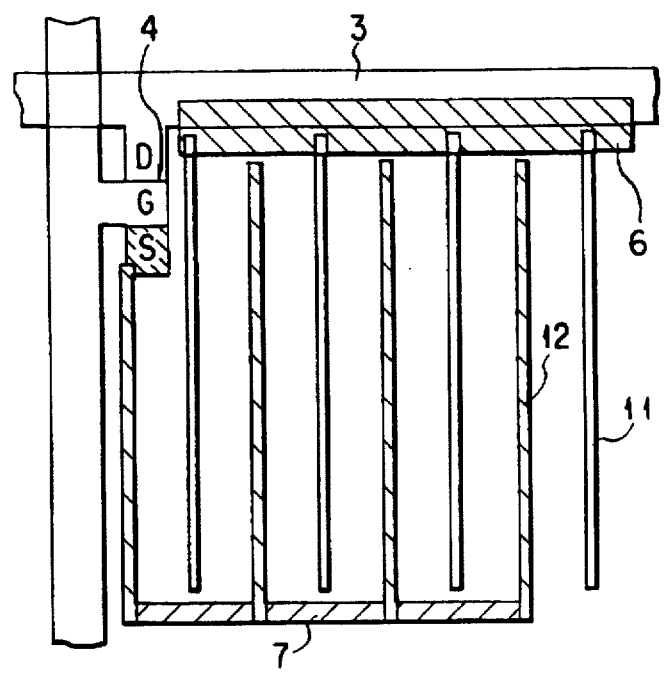
F I G. 16

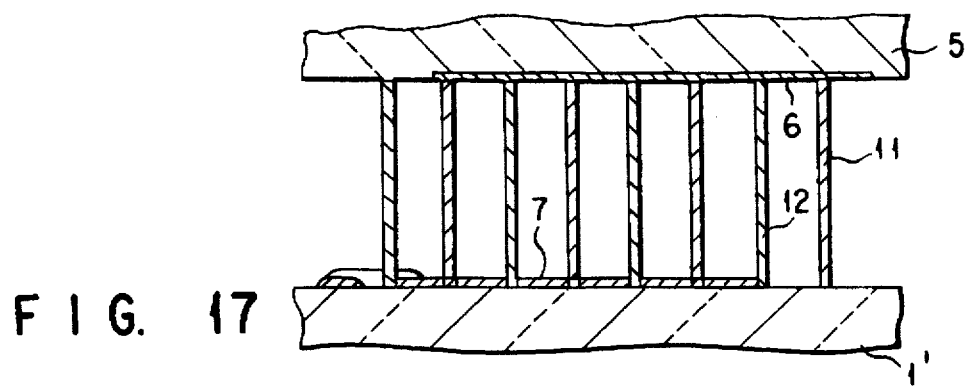
F I G. 17
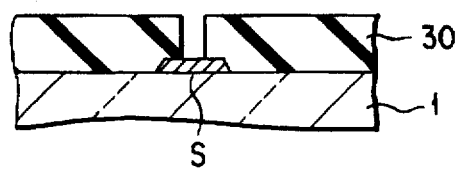
F I G. 18A
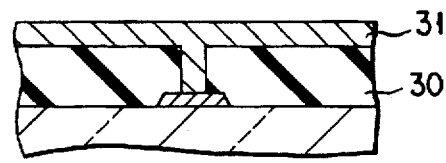
F I G. 18B
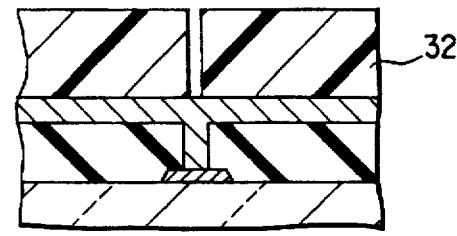
F I G. 18C
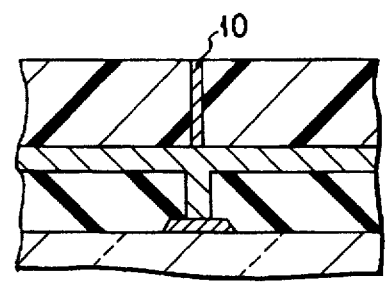
F I G. 18D
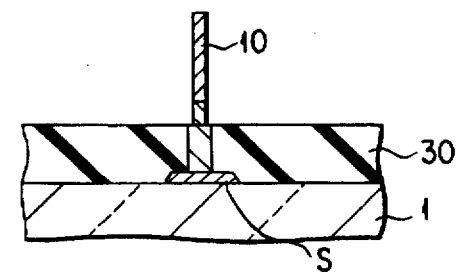
F I G. 18E

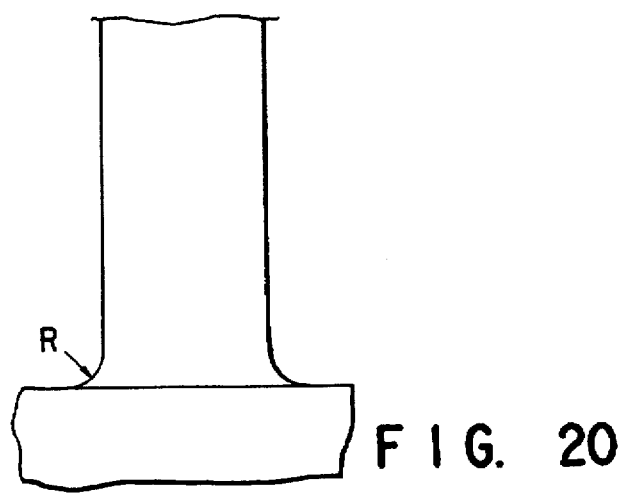
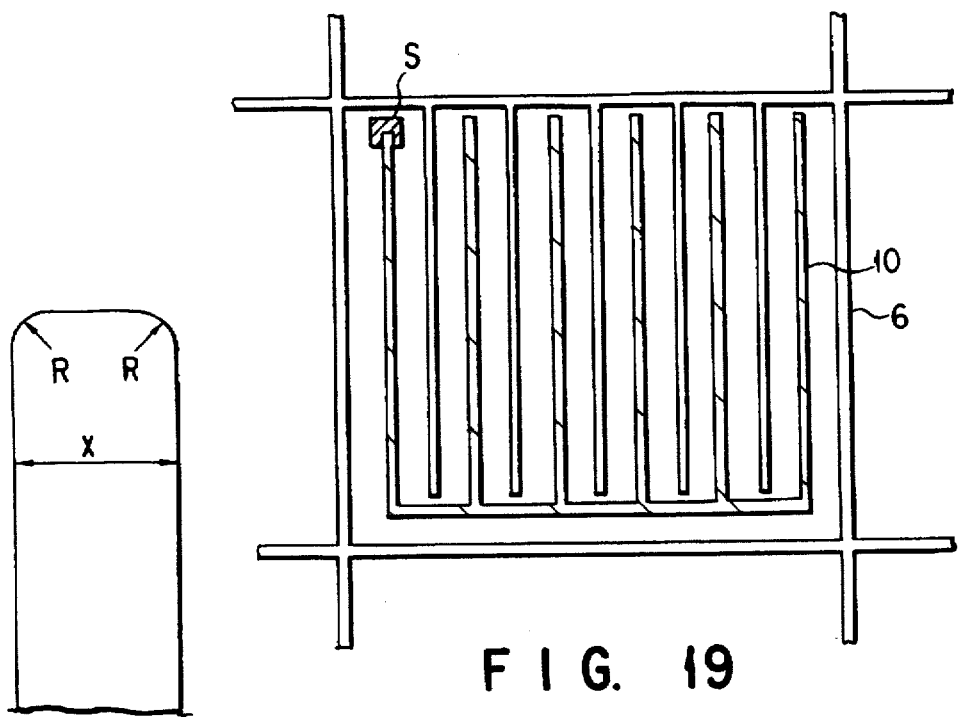
FIG. 19
FIG. 20
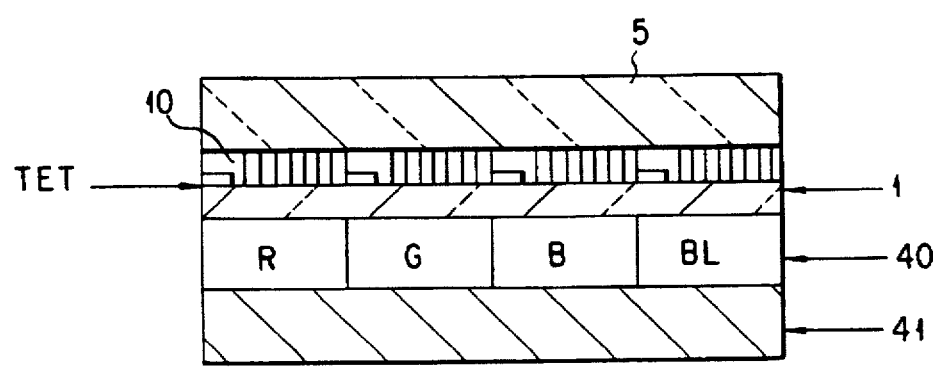
FIG. 21

REFLECTION TYPE LIQUID CRYSTAL DISPLAY DEVICE HAVING COMB-SHAPED WALL ELECTRODE

BACKGROUND OF THE INVENTION

1. Field of the Invention

The present invention relates to a liquid crystal display device.

2. Description of the Related Art

It is expected that liquid crystal display (LCD) devices will be more widely applied to various types of display terminals such as displays of personal computers, displays of car navigation systems, and displays of household or portable multi-media equipment.

Reflection type LCD devices developed thus far are driven at low power consumption. However, because of the use of polarizing plates, display screens are dark and the contrast is not adequate. Transmission type LCD devices having a back light are designed to form images by controlling the back light by shutters of liquid crystal. In the transmission type LCD devices, in order to compensate for a decrease in light amount due to polarizing plates, much power is consumed and an initial light amount is increased. Thus, large-sized batteries need to be mounted in portable devices. Therefore, the transmission type LCD devices having a back light are not suitable for use in portable devices.

On the other hand, in a guest-host type LCD device in which a dichroic dye is added to a liquid crystal and the arrangement of the dichroic dye is controlled by the arrangement of the liquid crystal, polarizing plates can be dispensed with. However, in this type of device, the thickness of an LCD layer needs to be increased to some degree in order to enhance the contrast. Consequently, the voltage to be applied must be increased. The same problem arises in a White-Taylor guest-host type LCD device in which a chiral nematic liquid crystal is used in the host, in order to compensate the performance of the dichroic dye, and a cholesteric/nematic phase transition is utilized.

Besides, a polarizing plate is not required in polymer dispersed liquid crystal displays (PDLC) in which liquid crystal molecules are dispersed in a polymeric material. In this device, too, if the thickness of a liquid crystal layer is increased in order to obtain a sufficient contrast, an applied voltage must be increased.

SUMMARY OF THE INVENTION

The present invention has been made in consideration of the above problems and the object thereof is to provide a liquid crystal display device capable of operating at a low driving voltage and obtaining an adequate contrast.

In order to achieve the above object, there is provided a liquid crystal display device comprising:

two substrates opposed to each other;

a comb-shaped wall electrode formed to correspond to each pixel of an array defined by vertical and horizontal wires formed on said substrates, and having a plurality of elemental electrodes, major surfaces of each of said elemental electrodes being substantially perpendicular to the surfaces of said two substrates, and the major surfaces of adjacent ones of said elemental electrodes constituting counter electrodes to each other; and a liquid crystal filled in a gap of said comb-shaped wall electrode provided between said two substrates.

BRIEF DESCRIPTION OF THE DRAWINGS

FIG. 3 is an enlarged view of a silicon block used in a comb-shaped wall electrode in another LCD device of the invention;

FIG. 4A is a plan view showing a silicon block, and

FIG. 4B is a plan view showing a part of a pixel of an active matrix type LCD device with a comb-shaped wall electrode using a silicon block;

FIG. 9 is a plan view of an LCD device according to an example of the invention;

FIGS. 11A to 11D are cross-sectional views showing the steps of manufacturing the comb-shaped wall electrode of the LCD device according to the example of the invention;

FIG. 12 is a cross-sectional view showing the structure of a comb-shaped wall electrode of an LCD device according to another example of the invention;

FIG. 13 is a plan view showing the shape of an elemental electrode of the comb-shaped wall electrode of an LCD device according to another example of the invention;

FIG. 14 is a plan view showing a pattern of the comb-shaped wall electrode of an LCD device according to another example of the invention;

FIG. 15 is a plan view showing a pattern of a comb-shaped wall electrode of an LCD device according to still another example of the invention;

FIG. 16 is a plan view of an LCD device according to still another example of the invention;

FIG. 17 is a cross-sectional view of the structure of the comb-shaped wall electrode of an LCD device according to still another example of the invention;

FIGS. 18A to 18E are cross-sectional views showing the steps of manufacturing the comb-shaped wall electrode of an LCD device according to still another example of the invention;

FIG. 19 is a plan view showing a comb-shaped wall electrode and common electrode of still another example of the invention;

FIG. 20 is a side view showing the structure of an elemental electrode of a comb-shaped wall electrode according to still another example of the invention; and FIG. 21 is a cross-sectional view showing an LCD device according to still another example of the invention.

DETAILED DESCRIPTION OF THE PREFERRED EMBODIMENTS

The present invention will now be described in detail with reference to the accompanying drawings.

Figure 1:
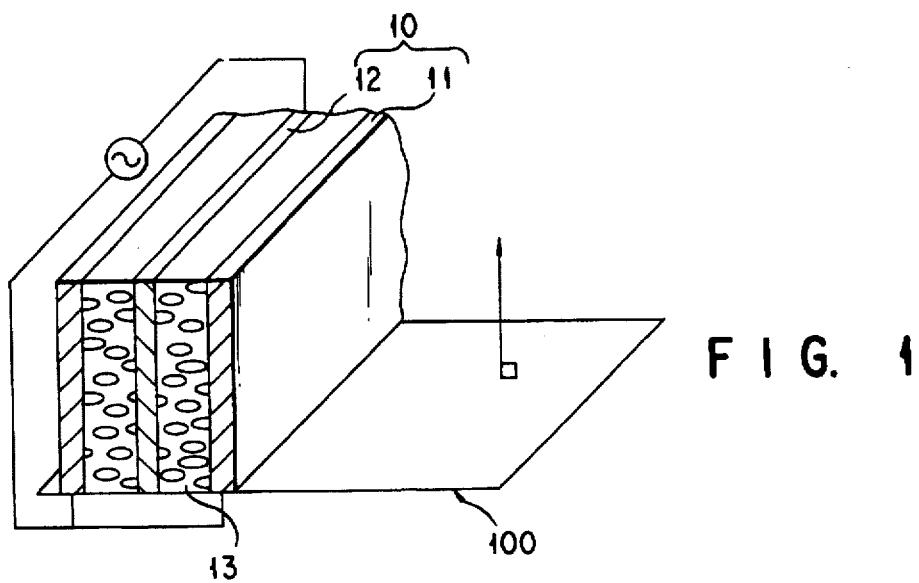
FIG. 1 is a view for illustrating the principle of a liquid crystal display (LCD) device of the present invention.

The principle of a liquid crystal display (LCD) device according to the present invention will now be described with reference to FIG. 1. FIG. 1 is a perspective view showing a part of a comb-shaped wall electrode formed on a pixel. The pixel 100 is one of a plurality of pixels defined by vertical and horizontal wires formed on the surface of one of two mutually opposed substrates. Active devices (not shown) such as a thin film transistor (TFT) and a thin film diode (TFD, MIM element) are provided for each pixel. The arrow in FIG. 1 indicates a direction normal to the pixel. A user views the display in a direction opposed to the direction of the arrow. In each pixel, a plurality of wall-like elemental electrodes 11 and 12 are alternately arranged such that the major surface of each electrode is substantially perpendicular to the two substrate surfaces and the mutually adjacent major surfaces constitute counter electrodes. These wall-like elemental electrodes 11 and 12 are alternately connected by connection sections, thereby constituting a comb-shaped wall electrode 10. Each of the elemental electrodes 11 and 12 has a height of, e.g. 15 μm, and a width of, e.g. 2 μm, and these electrodes 11 and 12 are patterned at an interval of 5 μm. When the comb-shaped wall electrode 10 is provided on the pixel having a square shape with each side of 100 μm according to the above dimensions, 15 elemental electrodes 11 and 12 in total are formed within the pixel. In addition, a liquid crystal 13 is filled in gaps among the comb-shaped wall electrodes 10 provided between the two substrates. Note that the sections alternately connecting the elemental electrodes 11 and 12 may have a wall-like shape or may not.

In this LCD device, the elemental electrodes 11 serving as one of the counter electrodes are connected to the active element, and the elemental electrodes 12 serving as the other of the counter electrodes are connected to a common electrode formed, for example, on the opposed substrate. That is, when a voltage is applied, the elemental electrodes 11 and 12, which constitute the counter electrodes, function as those equivalent to a pixel electrode and a common electrode of a conventional LCD device. Here, the active elements are controlled through the vertical and horizontal wires, more specifically, the gate lines (scanning lines) and signal lines. It should be noted that the structure of the active device may be improved so that a voltage is applied to the elemental electrodes 11 and 12 of the comb-shaped wall electrode from only one of the substrates. In this case, the turn-on/off of the voltage applied to the elemental electrodes 11 and 12 of the comb-shaped wall electrode 10 is controlled, thereby controlling the orientation of liquid crystal molecules filled between the elemental electrodes, and thus display is effected.

In the LCD device of the present invention, if it is supposed that the comb-shaped wall electrode has the above dimensions and a voltage of 5 V is applied between counter electrodes of the comb-shaped wall electrode, an electric field intensity of $10^6$ V/m can be applied to the LCD cell with a cell gap of 15 μm. Accordingly, a sufficient contrast can be obtained by driving at low voltage. Besides, since the comb-shaped wall electrode functions as a spacer when the LCD cell is constituted, a step of spraying spacers such as glass beads is not needed and the precision of the cell gap can be increased, as compared to the case of using spacers. Furthermore, since no spacer is included in the pixel, a defect of image due to the spacers can be prevented.

In the present invention, the material of the comb-shaped wall electrode is, for example, a semiconductor such as an impurity-doped silicon; a metal such as Al, Cu or Ni or an alloy thereof; a transparent conductive oxide film of ITO, etc.; or a conductive polymer.

The comb-shaped wall electrode can be formed by using a technique of etching, e.g. an impurity-doped silicon layer by reactive ion etching (RIE) with a resist used as a mask, thereby forming a trench. If the RIE process is performed, a certain degree of orientation regulating force can be applied to the liquid crystal by virtue of directivity of anisotropic etching. At the time of the RIE, it is possible to form a plurality of grooves in the major surfaces of the comb-shaped wall electrode in a direction substantially perpendicular to the surfaces of the two substrates and to apply orientation regulating force to the liquid crystal by means of the grooves. The shape of the grooves is not restricted, and each groove may have a rectangular, triangular, or wavy cross section.

The comb-shaped wall electrode can be formed by a method of exposing a photosensitive conductive polymer or a photosensitive polymer containing a conductive material through a predetermined mask, and thereafter developing the same. Besides, as will be described later, a silicon block may be anisotropically etched by using a KOH solution. Furthermore, the comb-shaped wall electrode may be formed by a method having the steps of forming an underlying metal, which serves as a plating electrode, on a substrate, coating a thick film resist on the underlying metal, forming patterned grooves in the thick film resist corresponding to the comb-shaped wall electrode, growing a metal in the grooves in the thick film resist by electroplating, and removing the thick film resist and an unnecessary portion of the underlying metal. Moreover, an LIGA (Lithographie Galvanoformung Abformung) process may be used.

It is desirable to use a guest-host type liquid crystal, or a polymer dispersed liquid crystal or a polymer network liquid crystal (self-supporting liquid crystal) as a liquid crystal material in the LCD device of the present invention, since there is no need to use a polarizing plate.

A description will now be given of the case of using the guest-host type liquid crystal. For example, it is desirable that an n-type liquid crystal exhibiting negative dielectric anisotropy be used as liquid crystal, a p-type dichroic dye having a greater absorbance for polarized light in a direction along the long axis of the molecule be added to the n-type liquid crystal, and the comb-shaped wall electrode in which grooves are formed by RIE, as described above, be used. In this case, if the grooves of the comb-shaped wall electrode is provided with such a liquid crystal orientation regulating force that does not greatly act on the liquid crystal molecules, the color of dye molecules can be recognized on the screen since both the liquid crystal molecules and dye molecules are randomly orientated when no voltage is applied. On the other hand, when a voltage is applied, the liquid crystal molecules are orientated in parallel to the electrodes along the grooves, i.e. vertically to the screen. Accordingly, the dye molecules are orientated vertical to the screen and the long axis of molecules is vertically situated. Thus, the color of dye molecules becomes invisible.

Alternatively, a p-type liquid crystal exhibiting positive dielectric anisotropy may be used as liquid crystal, an n-type dichroic dye having a greater absorbance for polarized light in a direction along the short axis of the molecule may be added to the p-type liquid crystal, and the comb-shaped wall electrode without any groove may be used. In this case, the color of dye molecules can be recognized on the screen since both the liquid crystal molecules and dye molecules are randomly orientated when no voltage is applied. On the other hand, when a voltage is applied, the liquid crystal molecules are orientated perpendicular to the electrodes, i.e.

in parallel to the screen. Accordingly, the dye molecules are orientated in parallel to the screen and the short axis of molecules is vertically situated. Thus, the color of the dye molecules becomes invisible.

Alternatively, a p-type liquid crystal exhibiting positive dielectric anisotropy may be used as liquid crystal, a p-type dichroic dye having a greater absorbance for polarized light in a direction along the long axis of the molecule may be added to the p-type liquid crystal, and the comb-shaped wall electrode in which grooves are formed may be used. In this case, the color of dye molecules cannot be recognized on the screen since both the liquid crystal molecules and dye molecules are orientated vertical to the screen along the grooves when no voltage is applied. On the other hand, when a voltage is applied, the liquid crystal molecules are orientated perpendicular to the electrodes, i.e. in parallel to the screen. Accordingly, the dye molecules are orientated in parallel to the screen. Thus, the color of the dye molecules becomes visible.

When the guest-host type liquid crystal is used, it is desirable that the height of the wall of the comb-shaped wall electrode, which corresponds to the cell gap, be 15 to 40 μm. If the height of the wall is less than 15 μm, the contrast ratio may become insufficient. If the height of the wall exceeds 40 μm, the formation of the comb-shaped wall electrode becomes difficult. In addition, it is desirable that the interval of the electrodes be 10 μm or less. If the interval of the electrodes exceeds 10 μm, the driving at high voltage tends to be required and this tendency is undesirable.

On the basis of the above principle, the LCD device of the present invention can be applied to a transmission type LCD device with a back light or a projection type light shutter. If a black dichroic dye is used and the background of the device is formed by a reflector or a paper-white plate, a reflection type LCD with good contrast can be obtained. In addition, three liquid crystal layers corresponding to the three primary colors may be formed. When an electric field is applied to the three layers, black display is effected. When no electric field is applied, white display is effected. By varying the combination of applied electric fields, multi-color display is achieved.

Figure 2:
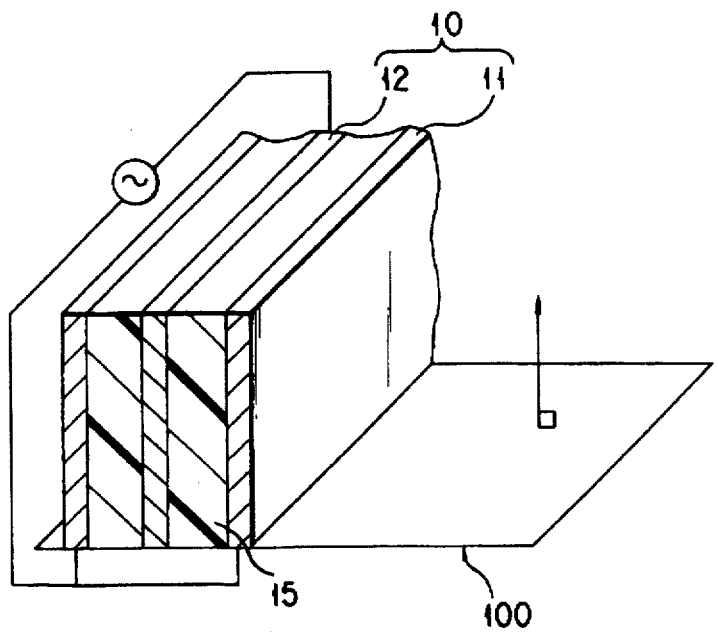
FIG. 2 is a view for illustrating the principle of another LCD device of the invention.

With reference to FIG. 2, a description will now be given of cases where a polymer dispersed liquid crystal or a polymer network liquid crystal is used. FIG. 2 is a perspective view showing a part of a comb-shaped wall electrode formed on one pixel. The basic structure of this wall electrode is the same as that of the comb-shaped wall electrode shown in FIG. 1. A polymer dispersed liquid crystal 15, in which liquid crystal molecules are dispersed in a polymer material, e.g. polyethylhexyl acrylate (PEHA), is filled in the gap of the comb-shaped wall electrode 10 provided between the two substrates. The connection among the elemental electrodes 11 and 12, active devices and common electrode is the same as that in the LCD device shown in FIG. 1. In the case of the LCD device shown in FIG. 2, display is enabled by controlling the turn-on/off of a voltage applied to the elemental electrodes 11 and 12 of the comb-shaped wall electrode 10 and thereby controlling the light scattering and transmission of the polymer dispersed liquid crystal or polymer network liquid crystal filled between the elemental electrodes 11 and 12. In addition, three pixels are juxtaposed and color filters are provided for the three pixels. Thus, a color LCD device can be manufactured.

When the polymer dispersed liquid crystal or polymer network liquid crystal is used, it is desirable that the height of the wall of the comb-shaped wall electrode which corresponds to the cell gap be set at 30 to 40 μm and the interval of the electrodes be set at 10 μm or less. If the height of the wall of the comb-shaped wall electrode is 30 μm or more, sufficient light scattering can be effected at the time of applying a voltage. However, if the height of the wall exceeds 40 μm, the formation of the comb-shaped wall electrode becomes difficult. Furthermore, if the interval of the electrodes exceeds 10 μm, a driving at high voltage tends to be required and this tendency is undesirable.

In the present invention, when the polymer dispersed liquid crystal or polymer network liquid crystal is used, it is preferable to properly control the refractive indices of the polymer and liquid crystal and the dispersion state of liquid crystal.

In general, in the polymer dispersed liquid crystal display device, display is effected by making use of the difference in refractive indices between the polymer material and liquid crystal. The liquid crystal has two refractive indices $n_o$ and $n_e$ for ordinary light and extraordinary light. When an electric field is not applied, the liquid crystal molecules are randomly orientated in the polymer matrix. Since the refractive index of the liquid crystal molecules does not match with that of the polymer material, light scattering occurs and the material system looks whitely opaque. In the case of the p-type liquid crystal exhibiting positive dielectric anisotropy, when an electric field is applied, the molecular axes of the liquid crystal molecules are orientated in the direction of the electric field, i.e. in the direction ordinary to the panel surface. At this time, since the direction of the component with refractive index $n_o$ for ordinary light is parallel to the panel surface, only the refractive index component for ordinary light is observed. If the refractive index $n_o$ for ordinary light is set to be substantially equal to the refractive index $n_p$ of the polymer material, the material system becomes transparent. At this time, if the background is black, a high contrast is obtained.

On the other hand, in the case where the polymer dispersed liquid crystal is filled in the gap of the comb-shaped wall electrode, as mentioned above, if an electric field is applied to the comb-shaped wall electrode, the molecular axes of the liquid crystal molecules are orientated in the direction of the electric field, i.e. in parallel to the panel surface. In this case, the light visible from the panel surface is influenced by both components of the ordinary light refractive index and extraordinary light refractive index. Accordingly, even if only one of the refractive indices is matched with the refractive index of the polymer material, the other refractive index does not match with the refractive index of the polymer material. As a result, the transparency decreases as a whole. It is necessary, therefore, to match both ordinary and extraordinary light refractive indices of the liquid crystal molecules with the refractive index of the polymer material. Accordingly, it is desirable to select such a material system that the refractive index of the polymer material has an intermediate value between the refractive indices $n_e$ and $n_o$ of the liquid crystal. More specifically, it is desirable that the difference between the refractive index $n_e$ of liquid crystal molecules in the direction of the extraordinary axis and the refractive index of the polymer material be 0.05 or less and also the difference between the refractive index $n_o$ of liquid crystal molecules in the direction of the ordinary axis and the refractive index of the polymer material be 0.05 or less.

When light scattering is mainly due to the difference in refractive index between the polymer material and the p-type liquid crystal, as in the case of a conventional polymer dispersed LCD, it is desirable that the difference in refractive index between the liquid crystal and polymer material be as high as possible. Considering this point alone, if the difference in refractive index between the liquid crystal and polymer material is decreased, as mentioned above, it is likely that the transparent state and opaque state cannot clearly be displayed. However, in the polymer dispersed liquid crystal or polymer network liquid crystal, light scattering occurs dependent on the shape of interfaces between the liquid crystal molecules and polymer material, too. Accordingly, by controlling the shape of the interfaces between the liquid crystals and polymer material, the transparent state and opaque state can be clearly displayed even if the difference in refractive indices therebetween is small. Specifically, it is desirable that the shape of the interfaces between the liquid crystal molecules and polymer material be a shape with many fine planes having a side length close to the wavelength of visible light. If the interfaces have such a shape, visible light can be sufficiently scattered. In this case, when an electric field is applied, the interface state is disordered by the orientation of the liquid crystal molecules and the transparent state is displayed.

The aforementioned interfaces with many fine planes between the liquid crystal molecules and polymer material can be formed, for example, by a method in which a monomer or a precursor of a polymer, which has good compatibility with the liquid crystal molecules, is used. According to this method, when monomers are polymerized and the polymer is phase-separated from the liquid crystal, the remaining monomer portion is satisfactorily mixed with the liquid crystal molecules. As a result, the aforementioned interfaces are formed. In addition, at the time of polymerization reaction, the liquid crystal molecules and monomer molecules may be fully mixed by application of ultrasonic waves.

In the present invention, when the reflection type LCD is manufactured by using the polymer dispersed liquid crystal or polymer network liquid crystal, for example, the rear surface of a glass substrate on which the comb-shaped wall electrode is formed is blackened. Alternatively, when the active devices such as TFT are formed, the substrate is blackened in advance. On the black substrate, the comb-shaped wall electrode is formed. In this state, a mixture of monomers and liquid crystal molecules are injected, the monomers are polymerized, and a liquid crystal layer consisting of a mixture of the liquid crystal molecules and polymer material is formed within the gap in the comb-shaped wall electrode. In this case, when a voltage is applied to the LCD device, the liquid crystal molecules are orientated and the refractive index of the liquid crystal agrees with that of the polymer matrix. Thus, the black substrate becomes visible. On the other hand, if the application of the applied voltage is stopped, the liquid crystal molecules are randomly orientated and reflection occurs due to light scattering. Thus, the pixel looks white.

A detailed description will now be given of a method suitable for the formation of the comb-shaped wall electrode in the LCD device of the present invention. The comb-shaped wall electrode structure can be formed, for example, by a dry process using reactive ion etching (RIE) of silicon, as mentioned above. This method is advantageous in that the electrode can be formed in any shape. However, if this method is adopted, about 30 minutes are needed to form a trench of 20 μm in consideration of the present technology. In addition, a large-scale apparatus is needed and the manufacturing cost is high.

By contrast, if crystal planes of impurity-doped silicon are aligned and subjected to anisotropic etching by using a KOH aqueous solution, the comb-shaped wall electrode can be manufactured with high efficiency and low cost. The inventors have found the best method of selecting crystal planes suitable for the comb-shaped wall electrode in the LCD device in the present invention. In this method, for example, a (110) plane is set parallel to the LCD panel surface, and a (111) plane is set parallel to the wall surface of the electrode.

In this method, however, a problem may arise when elemental electrodes of the comb-shaped wall electrode and a part connecting one end to the elemental electrodes are formed into a box structure in one body. Specifically, when elemental electrodes and a connection part therebetween are formed at the same time, a (111) plane inclined from a top portion of the connection part towards the opening portion of the pixel may be left. If this phenomenon occurs between adjacent pixels, the electrodes may be connected between the pixels. It is understood, therefore, that the electrode should not have a box structure. Even in the case where the electrode structure is designed such that the connection part of the electrodes are not needed, if the side surface of the elemental electrode is at 90° to the (111) plane, a (111) plane inclined from the top portion of the side surface along the long axis of the elemental electrode may be left. In this case, too, if this phenomenon occurs between adjacent pixels, the electrodes may be connected between the pixels.

Figure 5:
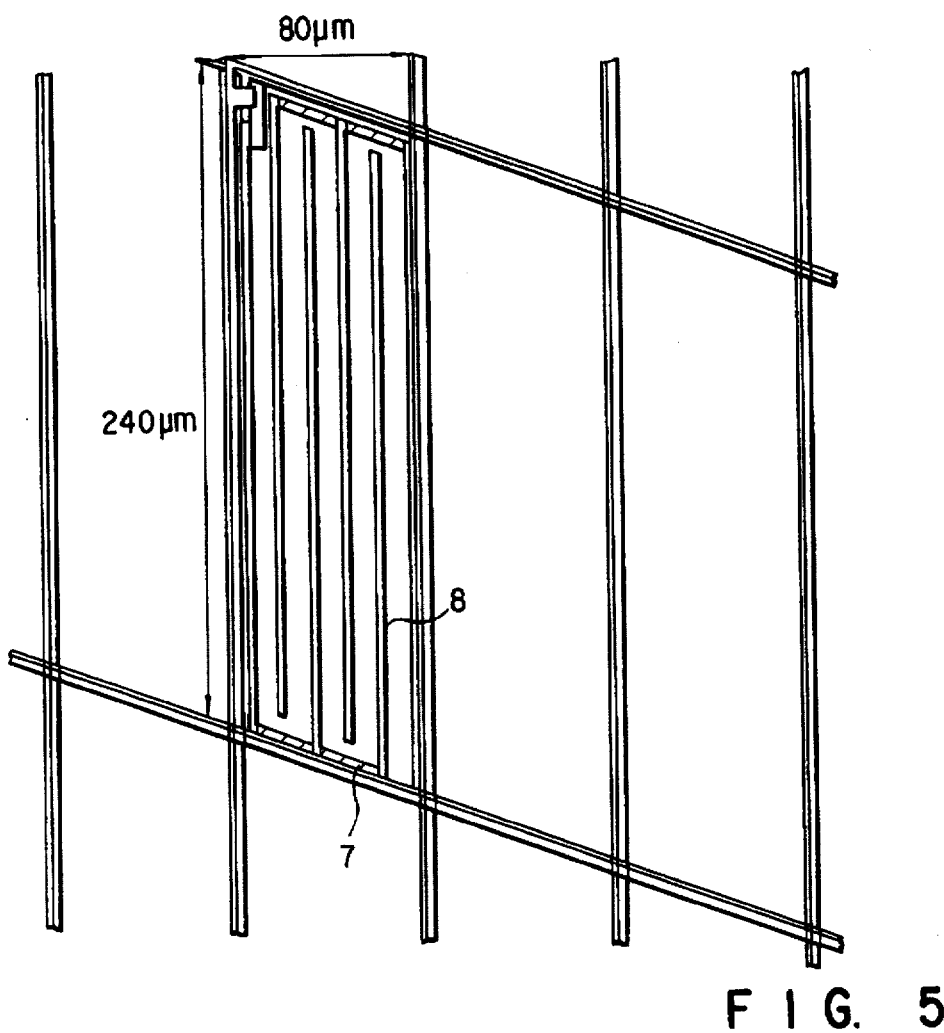
FIG. 5 is a plan view showing another example of a pixel of the active matrix type LCD device with a comb-shaped wall electrode using a silicon block.

The inventors have further studied the means for avoiding the above problem, and have found that no problem arises if the elemental electrodes are formed by using a columnar silicon block which has a substantially parallelogrammatic cross section, as shown in FIG. 3, in a plane substantially parallel to the substrate surface, has four side surfaces of silicon (111) planes, and is orientated in <110> direction substantially perpendicular to the substrate surface. In this case, it is necessary to provide connecting portions for setting the elemental electrodes at an equal potential, e.g. inter-electrode connection lines. FIG. 4B shows the comb-shaped wall electrode of the LCD device having this structure. Specifically, silicon blocks 8 each having four side surfaces of (111) planes are connected by inter-electrode connection lines 7 and a common electrode 6 so as to have an equal potential. Thereby, the comb-shaped wall electrode is constituted. The comb-shaped wall electrode is connected at one end to the source of a TFT 4. The columnar silicon block can be formed by patterning a resist mask in a parallelogrammatic shape. Since it is necessary to match the electrode shape with a desired device mode, the etching condition may become severe and the uppermost edge portion may be corroded. In such a case, a proper dummy pattern is provided to protect this portion. It should be noted that there is no problem with the driving of the device in the rectangular pixels in which gate lines and signal lines cross exactly at right angles. However, when the (111) plane is etched most preferentially and efficiently, it is desirable to form the pixels in a parallelogrammatic shape, as shown in FIG. 5, and thus a suitable method of driving the device needs to be examined. On the other hand, in this embodiment, the arrangement of the elemental electrodes may be variously changed to adjust and enlarge the angle of visibility within the pixels.

Figure 6:
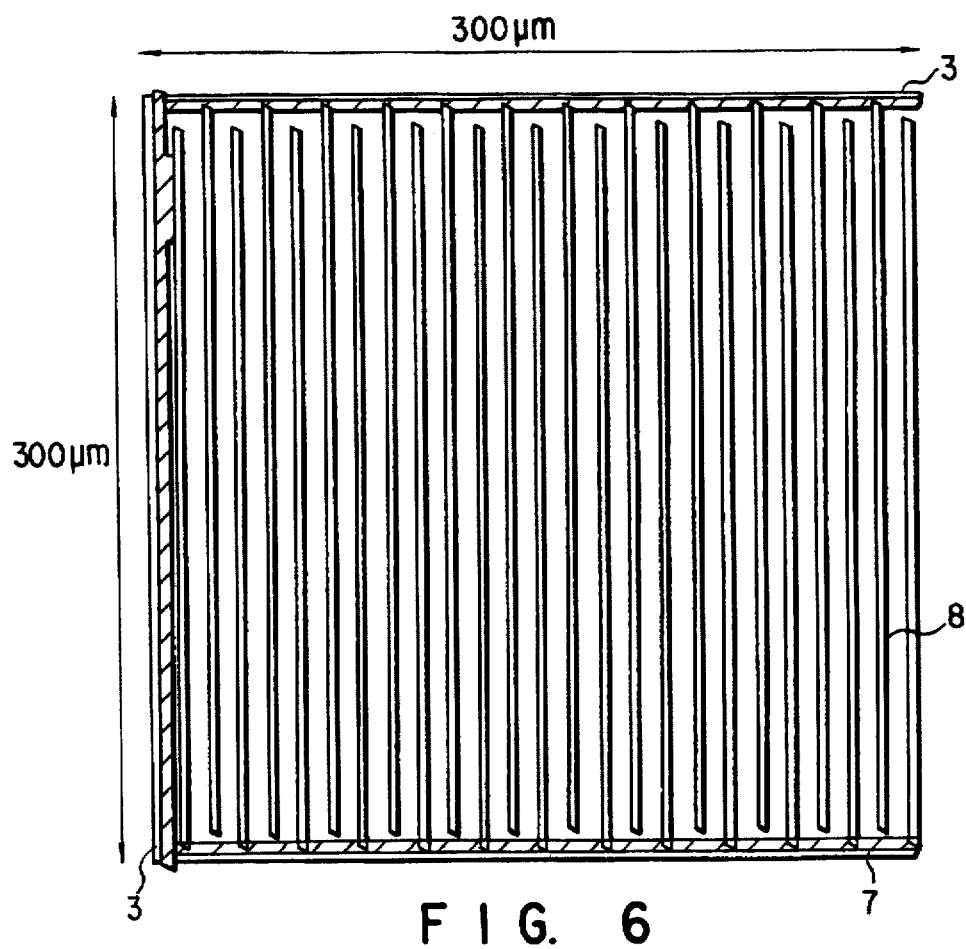
FIG. 6 is a plan view showing a part of a simple matrix type LCD device with a comb-shaped wall electrode using a silicon block.

The comb-shaped wall electrode using the above silicon block is applicable not only to the active matrix type LCD but also to the simple matrix type LCD. In this case, the driving method may be the same as that of the prior art, and only wiring is applied to the comb-shaped electrodes. FIG. 6 shows a simple matrix type LCD according to the present invention. As is shown in FIG. 6, a comb-shaped wall electrode comprising silicon blocks 8, inter-electrode connection lines 7 for alternately connecting the silicon blocks 8 and horizontal signal line 3 is provided over the entire pixel region, and vertical signal lines 3 are formed along end portions of the pixel region. The horizontal signal line 3 functions also as a connecting portion of the silicon blocks 8. In this case, the signal lines 3 and inter-electrode connection lines 7 may be formed on the opposed two substrates, respectively.

Figure 7:
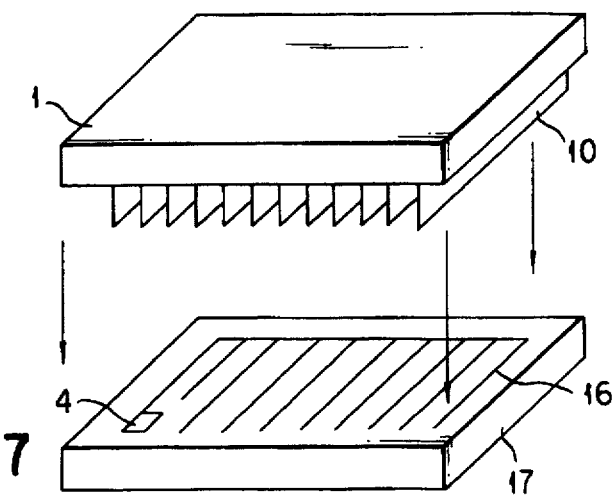
FIG. 7 illustrates a method of forming an LCD device with a comb-shaped wall electrode.
Figure 8A:
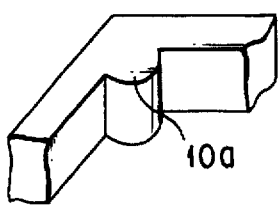
FIGS. 8A to 8D show the shapes of an elemental electrode of the comb-shaped wall electrode shown in FIG. 7.
Figure 8B:
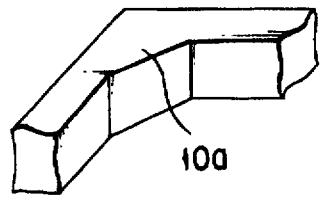
Figure 8C:
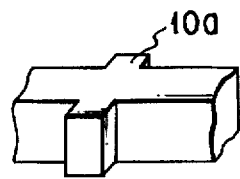
Figure 8D:
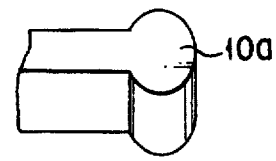

Another method suitable for fabricating the LCD device of the present invention will now be described with reference to FIG. 7. A comb-shaped wall electrode 10 is formed on a glass substrate 1. An opposed substrate 17 is provided with a planar electrode 16 having the same pattern as the elemental electrodes of the comb-shaped electrode 10 and TFTs 4, and is further provided with gate lines and signal lines, which are not shown. In this case, the planar electrode 16 can be formed of a conductive material such as a metal. The glass substrate 1 and opposed substrate 17 are attached under pressure and electrically connected to each other. In addition, a monomer and a liquid crystal are injected in the gap within the comb-shaped wall electrode 10. Then, the monomer is cured by ultraviolet radiation, etc., and a polymer dispersed liquid crystal is formed.

Since a stress is applied to the comb-shaped wall electrode 10 at the time of attaching the glass substrate 1 and opposed substrate 17, it is desirable to provide the elemental electrodes of the comb-shaped wall electrode 10 with stress dispersion regions 10a, as shown in FIGS. 8(a) to 8(d). By this method, the manufacturing process can be simplified and the yield can be enhanced.

In a case where the upper portion of the electrode is flat and has a right-angled cross section, the upper end portion of the electrode coming in contact with the substrate surface may bend or deform at stress-concentrated portions when the two substrates are attached and fixed. Furthermore, if the top portion of the electrode closes the opening portion due to the deformation, a cause of a defect such as a short-circuit may occur. In order to avoid these problems, it is best to adopt the structure wherein the corners of the upper end portions of the electrodes are rounded. If the electrodes are shaped in this manner, their deformation can be limited to a minimum even if an excessive stress is applied at the time of attaching the opposed substrate. If such rounded corners are formed at the lower end portions of the electrodes, the stability and strength of the electrodes will increase.

In the present invention, when the reflection type LCD device is manufactured, the gate lines, signal lines and TFTs may be covered with insulating layers which will serve as a black background, and the comb-shaped wall electrode may be formed thereon. If the insulating layers are formed on the gate lines, signal lines and TFTs in this fashion, the comb-shaped wall electrode can be extended to overlap the gate lines, signal lines and TFTs and thus the opening ratio can be increased. Accordingly, brighter display is attained. Similarly, the TFTs and gate and signal lines are formed on, e.g., an $SiO_2$ substrate, through-holes are formed in the substrate, and wiring is formed on the opposed surface (on the comb-shaped wall electrode side). A silicon (110) plane is attached to the opposed surface by heat treatment and polished to a predetermined thickness. Then, the comb-shaped wall electrode is formed by means of photolithography or KOH etching. It is desirable to form the TFTs, etc. of a material having durability to polishing or KOH etching.

In the case of the simple matrix type device which does not use TFTs or TFDs, the signal lines, etc. can be hidden behind the substrate by the above technique. If the structure with through-holes is used, the order of the above processing steps may be changed. Specifically, after the comb-shaped wall electrode structure is prepared in advance, the signal lines and TFTs are formed in the rear-side portion of the substrate. In this case, RIE, etc. may be adopted.

The principle of the present invention is also applicable to a transmission type LCD device with a back light or a projection type light shutter. Specifically, the comb-shaped wall electrode is constructed to have such a height as to obtain adequate contrast, and transmission light is controlled. Thereby, this principle is applied to the transmission type LCD device or projection type LCD device. According to the present invention, the ranges of options on manufacturing methods and types of applicable liquid crystal display devices can be increased.

In addition, in order to enhance the display performance of the LCD device of the present invention, it is preferable to design a suitable planar pattern of the comb-shaped wall electrode.

For example, if the thickness of the elemental electrodes of the comb-shaped wall electrode is uniform within one pixel, the screen may look in rainbow colors due to grating effects. In order to prevent this problem, the adjacent elemental electrodes of the comb-shaped wall electrode are designed to differ in thickness so that the thickness of the elemental electrodes varies irregularly within the pixel. Similarly, when the rounded corners are formed at the upper end portion of the comb-shaped wall electrode, as mentioned above, it is desirable to make the radii of the rounded corners of the electrodes different, thereby to avoid grating effects. In addition, in order to increase the angle of visibility, it is possible to divide one pixel into a plurality of domains and to make the elemental electrodes of the comb-shaped wall electrode extend in different directions in the respective domains. Furthermore, in the case of the reflection type LCD device, the substrate surface may be properly roughened to irregularly reflect light, thereby enhancing the contrast.

EXAMPLES

Examples of the present invention will now be described with reference to the accompanying drawings.

Example 1

Figure 10:
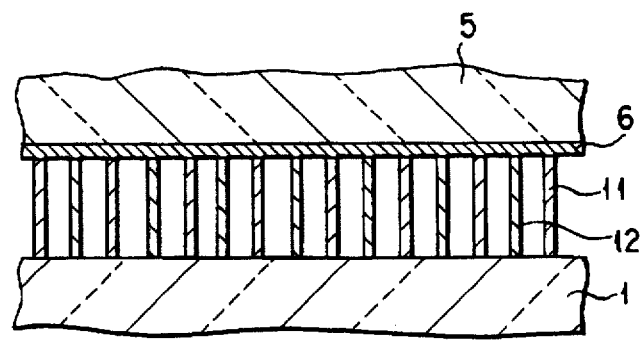
FIG. 10 is a cross-sectional view showing the structure of a comb-shaped wall electrode of the LCD device according to the example of the invention.

FIGS. 9 and 10 show a liquid crystal display device according to a first example of the present invention. A gate line 2 and a signal line 3 are formed at right angles with each other on a glass substrate 1, thereby defining a plurality of pixels. A thin film transistor (TFT) 4 having a gate electrode connected to the gate line 2, a drain region connected to the signal line 3, and a source region is formed in each pixel. Within each pixel, a plurality of elemental electrodes 11 and a plurality of elemental electrodes 12 are alternately arranged so that their major surfaces are situated perpendicular to the surfaces of two substrates and the major surfaces of adjacent ones of them constitute counter electrodes to each other. In addition, alternately arranged ones of these elemental electrodes are connected by a connecting portion. Thus, a comb-shaped wall electrode 10 is provided. Specifically, the elemental electrodes 11 are commonly connected at one side and similarly the elemental electrodes 12 are commonly connected at the other side. Each elemental electrode 11, 12 is patterned to have a height of 15 μm, a width of 2 μm and an interval of 5 μm between adjacent ones of the electrodes 11 and 12. Each elemental electrode 11, which is one of the opposed electrodes, is connected to a source region of the TFT 4. An opposed glass substrate 5 on which a common electrode 6 formed of ITO is provided is fixed on the comb-shaped wall electrode 10. The common electrode 6 is patterned on the glass substrate 5 so as to correspond to the gate line 2 and signal line 3 on the glass substrate 1, and is connected to only the common connection portions of the elemental electrodes 12. In addition, a liquid crystal utilizing a guest/host effect is filled in the gap in the comb-shaped wall electrode 10 provided between the two glass substrates 1 and 5.

The comb-shaped wall electrode 10 of this LCD device can be formed by a method illustrated in FIG. 11. A silicon substrate 21 having a sheet resistance of about 4 Ω/☐ is bonded to a glass substrate 1 by fusing or by simply using an adhesive (FIG. 11A). The silicon substrate 21 is polished and the thickness thereof is reduced to about 20 μm (FIG. 11B). The surface of the silicon substrate 2 is thermal-oxidized to form a silicon oxide film 22 having a thickness of about 2 μm (FIG. 11C). Further, a resist having a predetermined pattern is formed on the silicon oxide film 22. Using the resist as a mask, the silicon oxide film 22 and silicon substrate 21 are successively subjected to anisotropic etching by reactive ion etching (RIE) until the glass substrate 1 is exposed. Thus, a comb-shaped electrode 10 is formed (FIG. 11D). Thereafter, a TFT is formed at a predetermined area. It should be noted, however, that the TFT may be formed before the comb-shaped wall electrode 10 is formed.

Alternatively, the comb-shaped wall electrode may be formed by the following method. Oxygen is ion-implanted in a silicon substrate so that a silicon oxide film is formed in a region about 2 μm deep from the surface of the substrate. Then, a silicon layer is epitaxially grown from the surface of the silicon substrate such that the thickness of the silicon layer from the silicon oxide film becomes about 15 μm. Following this, anisotropic etching is effected by RIE in the same manner as above, and a comb-shaped wall electrode is formed.

In this type of LCD device, the height of the comb-shaped wall electrode 10, which defines a cell gap, is large, i.e. about 15 μm. In addition, an interval between the elemental electrodes 11 and 12 of the comb-shaped wall electrode 10, which determines the intensity of an electric field applied to the liquid crystal, is small, i.e. about 5 μm. Therefore, liquid crystal display with a high contrast ratio can be achieved at low drive voltage. In addition, the liquid crystal display is of the guest/host type, a polarizing plate is not needed. As mentioned above, a common electrode (ITO transparent electrode) is not present at a central region of the pixel. Moreover, when the comb-shaped wall electrode 10 is formed with the aforementioned dimensions, the opening ratio of 60% or more can be obtained despite the fact that the comb-shaped wall electrode 10 is opaque. Therefore, a bright display can be achieved. Furthermore, since the comb-shaped wall electrode 10 functions as a spacer at the time of constituting a liquid crystal cell, the step of spraying spacers are not needed, and the precision of the cell gap can be enhanced, as compared to the case of using the spacers. Moreover, a defect of image due to the spacers can be prevented.

In fact, the portion of the comb-shaped wall electrode alone is formed on the glass substrate by the above method. Al electrodes are connected to the common connection portions at the ends of the elemental electrodes 11 and 12. Then, an opposed glass substrate is placed on and attached to the resultant structure. An isotropic fluid prepared by adding 1 wt % of LCDD 465 (manufactured by Nippon Kayaku Co., Ltd.), as p-type dichroic dye, to an n-type liquid crystal or 4'-methoxybenzylidene-4-butylaniline (MBBA, manufactured by Tokyo Kasei) is vacuum-injected into the resultant structure. Thus, an experimental LCD cell is prepared. Using the experimental LCD cell, a voltage in the range of 1 to 10 V is applied between the Al electrodes provided at both ends, thereby to measure the physical contrast ratio. As a result, a reflection type display having a physical contrast ratio of 1:50 at 3.5 V is achieved.

As is shown in FIG. 12, in order to ensure the connection between the common electrode 6 on the surface of the opposed substrate and the elemental electrodes 12 constituting the comb-shaped wall electrode 10, the height of each elemental electrode 12 may be made greater than that of each elemental electrode 11. The comb-shaped wall electrode 10 shown in FIG. 12 can be formed by exposing the portions of the elemental electrodes 11 with use of a resist and subjecting them to RIE for a short time period. With this structure, the injection of liquid crystal is facilitated and the step of injection can be shortened. In the meantime, it is effective that the lowered portions of the elemental electrodes 11 are located at the end portions of the pixel.

Besides, as shown in FIG. 13, the major surfaces of the elemental electrodes 11 and 12 constituting the comb-shaped wall electrode may be provided with grooves 30, thereby to control the orientation of the liquid crystal. As mentioned above, when the liquid crystal molecules 13' and dichroic dye molecules 14 are used, the liquid crystal molecules 13' are orientated such that the long axes of the molecules are arranged along the grooves formed in the major surfaces of the elemental electrodes 11 and 12. The dichroic dye molecules 14, too, are arranged along the grooves, like the liquid crystal molecules 13'.

If the thickness of the elemental electrodes constituting the comb-shaped wall electrode is uniform within one pixel, a grating function may be caused and the screen may look in rainbow colors due to an interference effect. In order to prevent this, the adjacent elemental electrodes 11 and 12 of the comb-shaped wall electrode 10 may have different thicknesses, as shown in FIG. 14, and the thickness of the elemental electrodes 11 and 12 may be varied irregularly within one pixel.

Furthermore, as shown in FIG. 15, one pixel may be divided into four domains in order to increase the angle of visibility so that the elemental electrodes 11 and 12 of the comb-shaped wall electrode 10 may extend in different directions in the respective domains. The comb-shaped wall electrode with this structure can be formed in a single step by RIE technique. Thus, this structure is advantageous, as compared to the structure obtained by a method of forming a plurality of domains by performing masked rubbing steps several times. If this comb-shaped wall electrode is formed, the angle of visibility of the liquid crystal screen can be increased up to about 70°, which is no less than the angle of view field of a CRT.

Example 2

FIGS. 16 and 17 show a liquid crystal display device according to a second example of the present invention. A gate line 2 and a signal line 3 are formed at right angles with each other on a quartz substrate 1', thereby defining a plurality of pixels. A thin film transistor (TFT) 4 having a gate electrode connected to the gate line 2, a drain region connected to the signal line 3, and a source region is formed in each pixel. Within each pixel, a plurality of elemental electrodes 11 and a plurality of elemental electrodes 12 are alternately arranged so that their major surfaces are situated perpendicular to the surfaces of two substrates and the major surfaces of adjacent ones of them constitute counter electrodes to each other. In addition, alternately arranged ones of these elemental electrodes are connected by a connecting portion. Thus, a comb-shaped wall electrode 10 is provided. Specifically, the elemental electrodes 11 are commonly connected at one side by a common electrode and similarly the elemental electrodes 12 are commonly connected at the other side by inter-electrode connection lines 7. Each elemental electrode 11, 12 is patterned to have a height of 15 µm, a width of 2 µm and an interval of 5 µm between adjacent ones of the electrodes 11 and 12. Each elemental electrode 11, which is one of the opposed electrodes, is connected to a source region of the TFT 4. An opposed glass substrate 5 on which the common electrode 6 formed of ITO is provided is fixed on the comb-shaped wall electrode 10. The common electrode 6 is patterned on the glass substrate 5 so as to correspond to the gate line 2 and signal line 3 on the quartz substrate 1', and is connected to only the common connection portions of the elemental electrodes 11. In addition, a polymer dispersed liquid crystal in which liquid crystal molecules are dispersed in the polymer material is filled in the gap in the comb-shaped wall electrode 10 provided between the quartz substrate 1' and glass substrate 5.

The elemental electrodes 11 and 12 are formed in the following manner. A three-inch silicon wafer with a surface of (110) plane is attached to the quartz substrate 1' by baking at 400° C. The silicon wafer is polished by chemical-mechanical polishing to a thickness of 30 µm. A silicon oxide film is formed on the surface of the silicon. Then, a resist layer is formed on the silicon oxide film and the silicon oxide film is patterned by exposure and development. The pattern has a line width of 2 µm corresponding to the thickness of the elemental electrode, and a space width of 10 µm corresponding to the interval of the elemental electrodes. The pattern is so shaped that each elemental electrode may have a parallelogrammatic shape defined by a (111) plane in cross section parallel to the surface of the substrate. Using this pattern as a mask, the silicon oxide film is etched by RIE and then the silicon is etched at 80° C. by using a 15 wt % aqueous solution of KOH. Thus, the elemental electrodes 11 and 12 are formed. In addition, after the elemental electrodes 11 and 12 are formed, the inter-electrode connection lines 7 which become a common connection portion of the elemental electrodes 11 are formed on the quartz substrate 1'.

Ethylhexyl acrylate (EHA) is used as a reactive monomer and KAYARAD HX-620 (available from Nippon Kayaku Co., Ltd.) is used as a reactive oligomer. Darocure 1173 (available from Merck & Co., Inc.) is used as photopolymerization initiator for these substances. E-8 (available from Merck & Co., Inc.) having a relatively high refractive index anisotropy is used as liquid crystal material. The monomer and oligomer, on the one hand, and LCD material, on the other hand, are mixed at a weight ratio of 2:8. The weight ratio of the monomer to the oligomer is 1:1. Then, 0.01 wt % of the photopolymerization initiator is added to the mixture. The resultant material is injected in the gap within the comb-shaped wall electrode 10, and the glass substrate 5 on which the common electrode 6 is formed is placed thereon. The resultant structure is sealed by an epoxy resin and then exposed to ultraviolet. Thus, the monomer and oligomer are polymerized.

When a voltage is applied to the comb-shaped wall electrode to measure transmittance, the transmittance of 95% is obtained at a voltage of 5 V. In addition, when a black background layer is provided on the rear surface of the glass substrate, the reflectance of 55% is obtained, which is sufficiently high, as compared to high-quality paper having a reflectance of 65%.

Example 3

An LCD device of this example has the same structure as that of Example 2. However, another liquid crystal material is used and the display characteristics are evaluated.

As regards polymer materials, EHA is used as a reactive monomer and R-551 (available from Nippon Kayaku Co., Ltd.) is used as a reactive oligomer. Darocure 1173 (available from Merck & Co., Inc.) is used as photopolymerization initiator agent for these substances. E-7 (available from Merck & Co., Inc.) having a relatively high refractive index anisotropy is used as liquid crystal material. Like Example 2, these polymer materials and liquid crystal material are injected in the gap within the comb-shaped wall electrode 10 and polymerized.

When a voltage is applied to the comb-shaped wall electrode to measure transmittance, the transmittance of 95% is obtained at a voltage of 5 V. In addition, when a black background layer is provided on the rear surface of the glass substrate, the reflectance of 60% is obtained, which is sufficiently high, as compared to high-quality paper having a reflectance of 65%.

Moreover, with respect to the voltage-transmittance characteristics of this LCD device, a hysteresis phenomenon which often appears in a so-called polymer dispersed LCD device is very small. Specifically, the width of hysteresis of the LCD device of this example is small, i.e. 100 to 300 mV, although it is ordinarily about 1 V.

Example 4

A comb-shaped wall electrode having elemental electrodes having a thickness of 5 µm and an interval of 10 µm is formed by electroplating. Specifically, Cr having a predetermined pattern is deposited on a glass substrate by a lift-off method, and a region other than the pattern is covered with a resist layer using photolithography. On the Cr, Ni is grown up to 25 µm by an electroplating method. The same liquid crystal material, reactive monomer, etc. as in Example 2 are used. Like Example 2, these substances are injected in the gap within the comb-shaped wall electrode and polymerized. Thus, a polymer dispersed liquid crystal is prepared.

When a black background layer is provided on the rear surface of the glass substrate, the reflectance of 45% is obtained, which is sufficiently high, as compared to high-quality paper having a reflectance of 65%.

Example 5

The LCD device of this example has the same structure as that of Example 2. However, various types of polymer dispersed liquid crystals are used, and display characteristics are evaluated.

EHA monomer and each of the liquid crystal materials shown in Table 1 are mixed at a weight ratio of 1:1 and, like Example 2, the mixture is injected in the gap within the comb-shaped wall electrode 10 and polymerized. Thus, polymer dispersed liquid crystals in which liquid crystal molecules are dispersed in PEHA are prepared. The refractive index of PEHA is 1.54.

With respect to the manufactured LCD device, reflection/transmission characteristics are measured, like Example 2, and SEM observation is performed. Table 1 below shows the results of measurement and observation. In Table 1, symbol $\Delta_{op}$ indicates a difference between a refractive index $n_o$ of liquid crystal molecules in the direction of an ordinary axis and a refractive index of polymer material, symbol $\Delta ep$ indicates a difference between a refractive index $n_e$ of liquid crystal molecules in the direction of an extraordinary axis and a refractive index of polymer material, and An indicates refractive index anisotropy of LCD molecules.

TABLE 1

| liquid crystal | $n_O$ | $\Delta_{op}$ | $\beta_e$ | $\Delta_{ep}$ | $\Delta n$ |
|---|---|---|---|---|---|
| K15(BDH) | 1.534 | 0.006 | 1.717 | 0.177 | 0.183 |
| E7(Merck) | 1.523 | 0.017 | 1.741 | 0.201 | 0.218 |
| ZL1-4119(Merck) | 1.471 | 0.069 | 1.532 | 0.008 | 0.061 |
| ZL1-5092(Merck) | 1.471 | 0.069 | 1.549 | 0.009 | 0.078 |

When ZL1-4119 (refractive index anisotropy: 0.061) of the liquid crystal materials shown in Table 1 is used, a number of fine amorphous particles with the size of about 1 to 3 μm, which are greater than the wavelength (400 to 800 nm) of visible light, are formed at interfaces between LCD molecules and polymer material. When a voltage is applied, the reflectance of 52% is obtained, which is sufficiently high, as compared to high-quality paper having a reflectance of 65%. In addition, excellent transmittance of 96% is obtained with no background at a voltage of 5 V.

With respect to the combinations of the other liquid crystal materials and polymer material, the reflectance is high, i.e. 40% to 50%, but the transmittance decreases to about 70%. The characteristics are degraded as a whole. With respect to K15 and E7 among these combinations, even if the difference in refractive index anisotropy of liquid crystal is large, an electric field is applied in parallel to the surface of the substrate by using the comb-shaped wall electrode. It appears, therefore, that sufficient characteristics are not obtained by only matching the refractive index in the direction of ordinary axis. On the other hand, with respect to ZL1-5092, although the difference between the refractive index of ZL1-5092 and the refractive index of polymer material almost equals that in the case of ZL1-4119, it is found from SEM observation that interfaces capable of largely scattering light are formed between the liquid crystal molecules and the polymer material.

Example 6

The LCD device of this example has the same structure as that of Example 2. However, still another type of polymer dispersed liquid crystal is used, and display characteristics are evaluated.

Hydroxyethyl metacrylate (HEMA) monomer and the liquid crystal material (ZL1-5092) shown in Table 2 below are mixed at a weight ratio of 1:1 and, like Example 2, the mixture is injected in the gap within the comb-shaped wall electrode 10 and polymerized. Thus, a polymer dispersed liquid crystal in which liquid crystal molecules are dispersed in PHEMA is prepared. The refractive index of PHEHA is 1.509. The manufactured LCD device is subjected to SEM observation.

TABLE 2

| liquid crystal | $n_O$ | $\Delta_{op}$ | $n_e$ | $\Delta_{ep}$ | $\Delta n$ |
|---|---|---|---|---|---|
| ZL1-5092(Merck) | 1.471 | 0.038 | 1.549 | 0.040 | 0.078 |

It is understood, from Table 2, that the values of refractive indices $n_o$ and $n_e$ are in the range of ±0.05 of the refractive index of polymer material. When a voltage is applied, the reflectance of 55% is obtained, which is sufficiently high, as compared to high-quality paper having a reflectance of 65%. In addition, excellent transmittance of 90% is obtained with no background at a voltage of 5 V. When the state of the interfaces between the liquid crystal materials and polymer material is observed with SEM, it is found that the liquid crystals/polymer material interfaces are not so complex and does not have shapes capable of largely scattering visible light.

If the difference between the refractive index of the liquid crystal in one direction and that of the polymer material, which is the matrix, is too large, as in Example 5, light scattering occurs even if the liquid crystal molecules are orientated in a direction parallel to the surface of the substrate by application of electric field. Thus, it is difficult to obtain high transmittance characteristics. It is confirmed, however, that high transmittance characteristics are obtained by controlling to make interfaces between the liquid crystal molecules and the polymer material into suitable shapes for scattering visible light, if the values of refractive indices $n_o$ and $n_e$ are in the range of ±0.05 of the refractive index of polymer material.

Example 7

With reference to FIGS. 18A to 18E and 19, a description will now be given of an advantageous method according to Example 7 for maintaining good contact between the TFT and the comb-shaped wall electrode and increasing an opening ratio.

At first, a TFT, a signal line and a gate line are formed on a glass substrate. A photosensitive precursor of colored polyimide is coated on the entire surface thereof. The area excluding the source electrode of the TFT is exposed and cured, and developed to form a contact hole at a location corresponding to the source electrode. Then, the resultant structure is subjected to after-bake to form a colored insulating layer 30 (FIG. 18A). An ITO film is formed on the insulating layer 30 and patterned in a lattice shape, thereby forming the common electrode 6. The common electrode 6 may be provided on the opposed substrate.

Subsequently, a Cu layer 31, which is 0.02 μm thick and will become a plating electrode, is deposited on the entire surface of the resultant structure. The Cu layer 31 is connected to the source electrode (FIG. 18B). Then, a thick resist 32 (manufactured by Hoechst, trade name: AZ LP-10) is coated on the entire surface, prebaked, exposed to g-rays through a mask and developed, thereby forming an opening corresponding to the shape of the comb-shaped wall electrode to be formed. The resultant structure is post-baked at 80° C. (FIG. 18C). Subsequently, the underlying Cu layer 31 is used as plating electrode, and Ni or Cu is plated. Thus, the comb-shaped wall electrode 10 is formed (FIG. 18D). Finally, the resist 32 is dissolved by acetone and removed. Then, the unnecessary portion of the underlying Cu layer 31 is removed by RIE (FIG. 18E).

As is shown in FIG. 19, the comb-shaped wall electrode 10 is connected to the lattice-shaped common electrode 6.

The comb-shaped wall electrode 10 has a width of 2 μm, an interval of 8 μm and a height of 30 μ. According to another experiment, in the steps of coating a resist 16 μm thick, forming a predetermined opening and plating Cu to be formed into a comb-shaped wall electrode, the Cu grows vertically up to 45 μm, exceeding the thickness of the resist, without increasing the width thereof.

If the TFT and wiring on the glass substrate are covered with the insulating layer, as in the method illustrated in FIGS. 18A to 18E, and the comb-shaped wall electrode is formed thereon, the area of the comb-shaped wall electrode 10 can be increased and the opening ratio can be increased. Since the plating method is adopted, the contact between the TFT (source electrode) and the comb-shaped wall electrode can be ensured.

Moreover, if the lattice-shaped common electrode 6 is formed on the insulating film 30 so as to correspond to the underlying signal lines and gate lines, as shown in FIG. 19, the opening ratio can be further increased. At the same time, the contact between the common electrode and comb-shaped wall electrode can be ensured.

If the area of the portion in FIG. 19 which is surrounded by the outer periphery of the comb-shaped wall electrode and where the opposed electrodes overlap each other is compared with that in FIG. 9, it is clear that the area in FIG. 19 is greater. In the case of the structure shown in FIG. 19, the opening ratio is calculated as 81%.

Example 8

This example relates to a desired shape of the comb-shaped wall electrode. If the corner of the upper end portion of the comb-shaped wall electrode is rectangular, as described above, deformation may easily occur at the time of attaching the two substrates to each other, resulting in a defect. Thus, it is desirable to round the corner of the upper end portion of the comb-shaped wall electrode.

Specifically, the comb-shaped wall electrode having the shape as shown in FIG. 20 is obtained by dissolving and removing the resist with acetone in the step of FIG. 18E described in connection with Example 7, and then rinsing the resultant structure with a rinse liquid with pH 12. In fact, when comb-shaped wall electrodes having a width of 5 μm and 2 μm, respectively, are formed and observed by a microscope after the wall electrode 5 is rinsed, washed and dried, it is confirmed that the corner of the upper end portion of the comb-shaped wall electrode is rounded. In addition, fillets are formed at the bottom of the electrode, thus enhancing stability.

Two comb-shaped wall electrodes each having a width of 2 μm, an interval of 10 μm and a height of 30 μm, one being subjected to a rinsing step and the other of being subjected to a rinsing step, are formed on glass substrates. Like Example 2, the liquid crystal material and monomer are injected into the glass substrates having the respective comb-shaped wall electrodes, opposed substrates are placed thereon, the resultant structure is exposed to ultraviolet ray and polymerized, and the substrates are attached by the produced polymer. The display performances of the respective LCD devices thus obtained are evaluated, as in Example 2. In the case of the comb-shaped wall electrode which has not been subjected to the rinsing step, about 60% of the cells do not operate due to a short-circuit caused by the crushing of the electrodes at the time of attaching the opposed substrates. By contrast, there is no defective cell in the device of this example which has been subjected to the rinsing step.

It is desirable that the radius R of the rounded corner at the upper end portion of the comb-shaped wall electrode be $\frac{1}{10}$ or more of the width of the electrode x. If R is smaller than $\frac{1}{10}$ of x, it is difficult to avoid the short-circuit caused by the deformation of the electrodes sufficiently. The structural conditions for forming high-quality comb-shaped wall electrode with such rounded corners will now be described. Suppose that the height of the electrode is a, the interval of openings in the resist corresponding to the interval of electrodes is b, the width of the opening in the resist corresponding to the width of the electrode is c, and the thickness of the underlying metal which will become the plating electrode is d. The value c is preferably set to be greater than the width of the electrode to be formed, in consideration of a decrease in width of the electrode due to etching. Accordingly, the value b differs from the actual interval of the electrodes. In this case, it is desirable to meet the condition:

$a/b > 5/2$, $b/c > 2$, $a/d > 10$

In order to avoid the grating effect, it is desirable that the respective electrodes have different radii of rounded corners. Such a structure can be achieved by irregularly stirring the rinse liquid.

Example 9

This example relates to a structure capable of enhancing the reflectance of a reflection type color LCD device.

In a regular LCD device, a color filter is provided on the opposed substrate. However, in this structure, reflection light passes through the color filter, irrespective of the turn-on/off of the LCD cells. Consequently, the reflectance decreases to about 20%.

In order to solve this problem, the LCD is formed by the glass substrate 1, on which the TFT and comb-shaped wall electrode 10 are formed, and the opposed substrate 5, as shown in FIG. 21, and a color filter 40 and a reflector 41 are provided on the rear side of the glass substrate 1. In this device, reflection light passes through the color filter only when the LCD cells are turned on. Thus, the reflectance can be increased up to about 60%.

As has been described above in detail, according to the present invention, there is provided a liquid crystal display device capable of effecting display with a low drive voltage and a high contrast, while a defects due to spacers are eliminated.

What is claimed is:

1. A reflection type liquid crystal display device comprising:

two substrates opposed to each other;

a comb-shaped wall electrode formed to correspond to each pixel of an array defined by vertical and horizontal wires formed on said substrate, and having a plurality of elemental electrodes, major surfaces of each of said elemental electrodes being substantially perpendicular to the surfaces of said two substrates, and the major surfaces of adjacent ones of said elemental electrodes constituting counter electrodes to each other; and a liquid crystal filled in a gap of said comb-shaped wall electrode provided between said two substrates.

2. The liquid crystal display device according to claim 1, wherein said elemental electrodes of said comb-shaped wall electrode are alternately connected to an active element formed to correspond to each pixel and a common electrode.

3. The liquid crystal display device according to claim 2, wherein said active element and said common electrode are formed on different ones of said substrates.

4. The liquid crystal display device according to claim 2, wherein said active element and said common electrode are formed on the same one of said substrates, with an insulating film interposed therebetween.

5. The liquid crystal display device according to claim 2, wherein said common electrode has a lattice shape.

6. The liquid crystal display device according to claim 1, wherein said comb-shaped wall electrode comprises a plurality of columnar silicon blocks, each of which is arranged in a <110> direction substantially perpendicular to the surfaces of the substrates, has a parallelogrammatic cross section in a plane substantially parallel to the surfaces of the substrates and has four (111) side surfaces, and a connection portion for equalizing the potentials of said plurality of silicon blocks.

7. The liquid crystal display device according to claim 1, wherein said comb-shaped wall electrode is formed of a metal.

8. The liquid crystal display device according to claim 1, wherein an interval between elemental electrodes constituting said comb-shaped wall electrode is 5–10 μm.

9. The liquid crystal display device according to claim 1, wherein the adjacent ones of the elemental electrodes of said comb-shaped wall electrode are different in thickness.

10. The liquid crystal display device according to claim 1, wherein the elemental electrodes of said comb-shaped wall electrode extend partially in different directions.

11. The liquid crystal display device according to claim 1, wherein upper corners of the elemental electrodes of said comb-shaped wall electrode, which are put in contact with said substrate, are rounded.

12. The liquid crystal display device according to claim 11, wherein the radius of the rounded corners are 1/10 or more of the width of the elemental electrode.

13. A reflection type liquid crystal display device comprising:

two substrates opposed to each other;

a comb-shaped wall electrode formed to correspond to each pixel of an array defined by vertical and horizontal wires formed on said substrate, and having a plurality of elemental electrodes, major surfaces of each of said elemental electrodes being substantially perpendicular to the surfaces of said two substrates, and the major surfaces of adjacent ones of said elemental electrodes constituting counter electrodes to each other; and a liquid crystal filled in a gap of said comb-shaped wall electrode provided between said two substrates, wherein said liquid crystal is a guest-host type liquid crystal.

14. The liquid crystal display device according to claim 13, wherein a plurality of grooves are formed in major surfaces of each of the elemental electrodes of the comb-shaped wall electrode, said grooves extending in a direction substantially perpendicular to the surfaces of the two substrates.

15. The liquid crystal display device according to claim 13, wherein an n-type liquid crystal is used as said liquid crystal, and a p-type dichroic dye is added to said n-type liquid crystal.

16. The liquid crystal display device according to claim 13, wherein said comb-shaped wall electrode has a height of 15 to 40 μm.

17. A reflection type crystal display device comprising:

two substrates opposed to each other;

a come-shaped wall electrode formed to correspond to each pixel of an array defined by vertical and horizontal wires formed on said substrate, and having a plurality of elemental electrodes, major surfaces of each of said elemental electrodes being substantially perpendicular to the surfaces of said two substrates, and the major surfaces of adjacent ones of said elemental electrodes constituting counter electrodes to each other; and a liquid crystal filled in a gap of said comb-shaped wall electrode provided between said two substrates, wherein the liquid crystal is one selected from the group consisting of a polymer dispersed liquid crystal and a polymer network liquid crystal.

18. The liquid crystal display device according to claim 17, wherein a polymer material in which a p-type liquid crystal is dispersed is filled in a gap within said comb-shaped wall electrode, and the difference between a refractive index $n_e$ of liquid crystal molecules in the direction of an extraordinary axis and the refractive index of said polymer material is 0.05 or less and also the difference between a refractive index $n_o$ of liquid crystal molecules in the direction of an ordinary axis and the refractive index of said polymer material is 0.05 or less.

19. The liquid crystal display device according to claim 17, wherein said comb-shaped wall electrode has a height of 30 to 40 μm.

* * * * *